United States Patent

Koakutsu et al.

[11] Patent Number: 5,987,224
[45] Date of Patent: Nov. 16, 1999

[54] PRINTING APPARATUS AND A CONTROL METHOD THEREFOR

[75] Inventors: Naohiko Koakutsu; Kazuhisa Aruga; Kazuko Fukano; Yoshikazu Ito; Masahiro Minowa; Asahiro Oguchi, all of Suwa, Japan

[73] Assignee: Seiko Epson Corporation, Tokyo, Japan

[21] Appl. No.: 08/768,731

[22] Filed: Dec. 18, 1996

[30] Foreign Application Priority Data

| Dec. 18, 1995 | [JP] | Japan | 7-329349 |
| Mar. 14, 1996 | [JP] | Japan | 8-057941 |
| Mar. 26, 1996 | [JP] | Japan | 8-069645 |

[51] Int. Cl.$^6$ .................................................. B41B 15/00
[52] U.S. Cl. .......................... 395/111; 395/111; 395/116; 395/117; 395/112
[58] Field of Search .................... 395/111, 116, 395/117, 112

[56] References Cited

U.S. PATENT DOCUMENTS

| 4,933,772 | 6/1990 | Ikenoue et al. | 358/300 |
| 5,140,674 | 8/1992 | Anderson et al. | 395/112 |
| 5,572,630 | 11/1996 | Azuma et al. | 395/111 |

FOREIGN PATENT DOCUMENTS

| 0 608 106 A1 | 1/1994 | European Pat. Off. | G06F 3/12 |
| 0 608 106 | 7/1994 | European Pat. Off. | |
| 0 654 757 A2 | 11/1994 | European Pat. Off. | G06K 15/00 |
| 0654757A2 | 11/1994 | European Pat. Off. | G06K 15/00 |
| 0 654 757 | 5/1995 | European Pat. Off. | |
| 6-47992 | 2/1994 | Japan | |

Primary Examiner—Edward L. Coles
Assistant Examiner—Twyler Lamb
Attorney, Agent, or Firm—Eric B. Janofsky

[57] ABSTRACT

While eliminating the need for a dedicated on-line selector switch, a printing apparatus and control method is provided to improve the processes required to replenish consumable printing materials consumed during the printing operation. Using a transport mechanism for transporting the print medium and a printing mechanism for printing to the print medium, the printing apparatus accomplishes the printing process based on data received from a host device, selectively switches between an on-line state and an off-line state and notifies the host device of the currently selected state. The printing apparatus further comprises sensors for detecting the presence of consumable products, including roll paper and ink, that are consumed by the printing process, a switch with two functional settings, and a control device. The two functional settings of the switch are an on-line function commanding a transition from the off-line state to the on-line state, and a second function for specifying the process, such as a paper feed operation, to be executed by the printing apparatus when consumable materials are replenished. The control device causes the printing apparatus to shift to the off-line state when a sensor detects that a particular consumable material is not present, and selects the on-line function of the switch when a sensor detects after switching to the off-line state that a particular consumable material is again present and available for printing.

25 Claims, 11 Drawing Sheets

PRINTING APPARATUS AND A CONTROL METHOD THEREFOR

BACKGROUND OF THE INVENTION

1. Field of the Invention

The present invention relates to a printer that executes a printing process based on commands and other data received from a host device, and relates specifically to a printer that interrupts the printing process until consumable materials that have been depleted are replenished and then executes a resume-printing process.

2. Description of the Related Art

The standard configuration for the data input/output device, host device, and printer in the point of sale or POS/ECR field has conventionally been an integrated, stand-alone system. In more recent years, however, faster data processing and more flexible system architectures have led to the development and wide-spread acceptance of distributed systems in which the data input/output device, host device, and printer are separated from each other and can be used in separate locations.

The printers used in such distributed systems are generally called "terminal printers." An example of a POS/ECR system using such a terminal printer in a restaurant or other food service business is described below.

The printer used in this application is called a "kitchen printer." When the waiter or waitress receives a customer order and enters the order to a hand-held data entry device, the order is transmitted immediately to a host device and printed to hard copy by the kitchen printer located in the kitchen. This system helps prevent errors because the operator can process the information while viewing the print content, thereby facilitating the management and processing of goods sold. These benefits have led the way to similar systems being introduced in a variety of businesses.

It is often the case, however, that cooking appliances, safes, or other relatively more important equipment be given priority in selecting installation space. This has increased demand for compact printers with a small footprint and space requirements, and compact printer designs necessarily limit the on-line availability of consumable printing materials, i.e., the size of the paper rolls that can be installed and the amount of ink in the ink cartridges. The host device is also usually located in a separate place due to restrictions in the operating environment. In addition, the printer typically prints large volumes of information, frequently resulting in consumable printer supplies being depleted while the system is in use.

The amount of paper that is left on the roll is detected using a paper-out sensor that detects when there is no more paper on the roll and a near-end sensor that detects when there is little paper left on the roll; and the amount of remaining ink left in the ink cartridge can be likewise monitored using a remaining-ink detector. When these consumable materials are depleted, the printing process is immediately stopped and the printer enters an off-line state in which additional print data cannot be received by the printer or storage of print data transferred to the printer is not assured. Loss of data sent from the host device is prevented in this case by notifying the host device that the printer is off-line.

When the host device is notified that the printer is off-line, an indicator is flashed or a buzzer is sounded to notify the operator that some or all consumable materials need replenishing. Once the consumable materials have been replenished, an on-line switch is pressed either intentionally, by closing the roll paper cover or ink cartridge cover to notify the host device that the printer is again on-line and printing can be resumed. More specifically, the operator must restore the printer to the on-line state and resume the printing process after adding roll paper or replacing the ink cartridge by manually operating an on-line switch. Alternatively, when one of the above covers is closed after replenishing the consumable materials, a cover sensor can detect that the cover is closed, restore the printer to the on-line state, and thereby enable resumption of the printing process.

When the roll paper is replaced it may also be necessary for the operator to operate a paper feed switch to advance a torn or discolored roll paper leader before resetting the printer to the on-line state by operating the on-line switch. Depending upon the type of ink cartridge used, ink build-up around the ink nozzles from which the ink is ejected may cause failure in ink ejection. In such cases the operator must operate a switch after installing a new ink cartridge to flush out any ink build-up, and then restore the printer to the on-line state by means of the operation described above.

While the above examples specifically address roll paper and ink cartridge depletion, similar problems occur with conventional thermal transfer printers that use a consumable ink ribbon. When the ink ribbon is depleted or nearly depleted, the printer goes off-line, and the operator must replace the ribbon and then restore the printer to the on-line state by means of an operation as described above.

At the same time, however, demand for low cost and high reliability have driven the need to reduce the number of parts and components while maintaining functionality. This has led to a reassessment of the need for cover sensors and dedicated on-line switches as used for the operations described above.

A technology for eliminating such on-line switches and cover sensors has been disclosed in Japanese laid-open patent number H6-47992 (47992/94-). The method of this technology assumes that the ink or other consumable material is replenished within a known predefined period after the printer goes off-line, and automatically restores the on-line status when this period is up.

The problem with this method is that the actual time required to replace the roll paper or other consumable materials varies according to the operator and the operator's familiarity with the printer, and it may be necessary or desirable to replace plural consumable materials at the same time, e.g., replace the ink cartridge at the same time as the roll paper. As a result, it may not always be possible to resume printing within a constant period of time. If printing is resumed before printing is actually possible, the information will not be correctly printed and print data may be lost. If this method is implemented with a kitchen printer as described above or cash register, loss of print data can result in business disruptions and problems.

OBJECTS OF THE INVENTION

Therefore, it is an object of the present invention to overcome the aforementioned problems.

It is a further object of the present invention to providing a printer from which a dedicated on-line switch and cover sensors are eliminated while retaining functionality, preventing printer data loss, and enabling restoration of the on-line state.

SUMMARY OF THE INVENTION

To achieve the above objects, a printing apparatus according to the present invention uses a transport mechanism for transporting the print medium and a printing means for printing to the print medium, is configured to accomplish the printing process based on data received from a host device, and selectively switches between a first state assuring processing of the host data, i.e., an on-line state, and a second state in which processing the host data is not assured, i.e., an off-line state, and notifies the host device of the currently selected state. The printing apparatus accomplishes this by means of a consumable materials detection means such as a paper-end sensor or remaining-ink sensor to detect the consumption or absence and the replenishment or presence of consumable materials, such as roll paper and ink, consumed in the printing process; an operating means that can be manually operated and selectively accomplishes a first function, e.g., an on-line function, for commanding a transition from the second (off-line) state to the first (on-line) state, and a second function for specifying the process to be executed by the printing apparatus when the consumable materials are replenished, e.g., a paper feed operation or ink nozzle refresh operation; a first state transition means for causing the printing apparatus to go off-line based on the detection of consumption or absence of consumable materials by the consumable materials detection means; and a function selecting means for selecting the on-line function of the operating means based on the detection of replenishment or presence of consumable materials by the consumable materials detection means after the first state transition means causes the printing apparatus to go off-line.

The first state is used herein in reference to the on-line state, which in the present invention means the state in which the printing process is executed. In a printing apparatus comprising internal data storage for receive data buffer, the data to be printed is read from the internal data storage and printed on the print medium in this state. In a printing apparatus not equipped with internal data storage, the printing process executed in this state prints the data received from the host device directly on the print medium.

The second state is used herein in reference to the off-line state, which is normally the state in which data transfers from the host device to the printing apparatus are stopped. When data is received in this state, print data is usually lost because any internal storage typically overflows or the print mechanism does not function. This state is therefore not necessarily a state in which data is not received from the host device.

The depletion or replenishment states may also simply mean that the consumable material is or is not present, and the consumable materials detection means may therefore simply be sensors detecting whether or not the consumable materials are present.

As a result, it is possible to provide a function, i.e., an on-line reset function, for restoring the printing apparatus to the on-line state when the operating means is operated after the operator replenishes the depleted consumable material when consumable materials consumed by the printing process are depleted and the printing apparatus goes off-line based on depletion detection by the consumable materials detection means.

For example, a paper-end sensor can be used as the consumable materials detection means for detecting depletion of the consumable print medium, i.e., printer paper, and a paper feed switch can be used as the operating means. In this case the primary function of the paper feed switch, which is to advance the print medium, is the process to be executed by the printing apparatus when the consumable roll paper is replenished. This makes it possible when the roll paper or other print medium is depleted and the printing apparatus goes off-line for the printing apparatus to return on-line and continue the printing process normally once the operator replenishes the print medium and operates the paper feed switch.

Selection of the on-line command function of the operating means in this case is preferably executed after waiting a predefined time from replenishment or presence detection by the consumable materials detection means. It is therefore possible to use the primary function of the operating means after the consumable materials are replenished, and replenishing the consumable materials can be more reliably accomplished. By operating the paper feed switch within a particular period in the above example, a paper feed operation can be executed, and the print medium can be easily and reliably accomplished.

It is further preferable in this case for the on-line command function to be selected after waiting a particular period after the last operation when the operating means is operated within a particular period. This makes it possible to eliminate the time-based constraints associated with using the primary normal function of the operating means after replenishing the consumable materials. This sequence makes it possible to avoid unintentional selection of the on-line state caused by the paper feed switch changing to the on-line command function while the print medium is still being advanced after replenishing the consumable materials to remove a damaged or discolored paper leader, for example.

It is also possible to select the on-line state while selecting the normal primary function of the operating means after waiting a particular period from selection of the on-line command function of the operating means. When the operator does not have time to operate the operating means or forget it, this makes it possible for the operating means to automatically resume normal operation after waiting a particular period, and the printing apparatus can be returned on-line.

After selecting the on-line function of the operating means in each of these cases, it is also possible to restore the on-line state based on particular command data which is processed immediately after received from the host device irrespective of the on-line or off-line state of the printing apparatus, i.e., real-time command data. It is therefore possible to restore the on-line state either manually or by command, and when the host device is remotely located the printing apparatus can be operated from any of the closer one of the printing apparatus and host device to the operator.

The present invention can also be expressed as a control method for a printing apparatus with the same effects and benefits described above.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The preferred embodiments of the present invention are described below with reference to the accompanying figures.

First Embodiment

Figure 1:
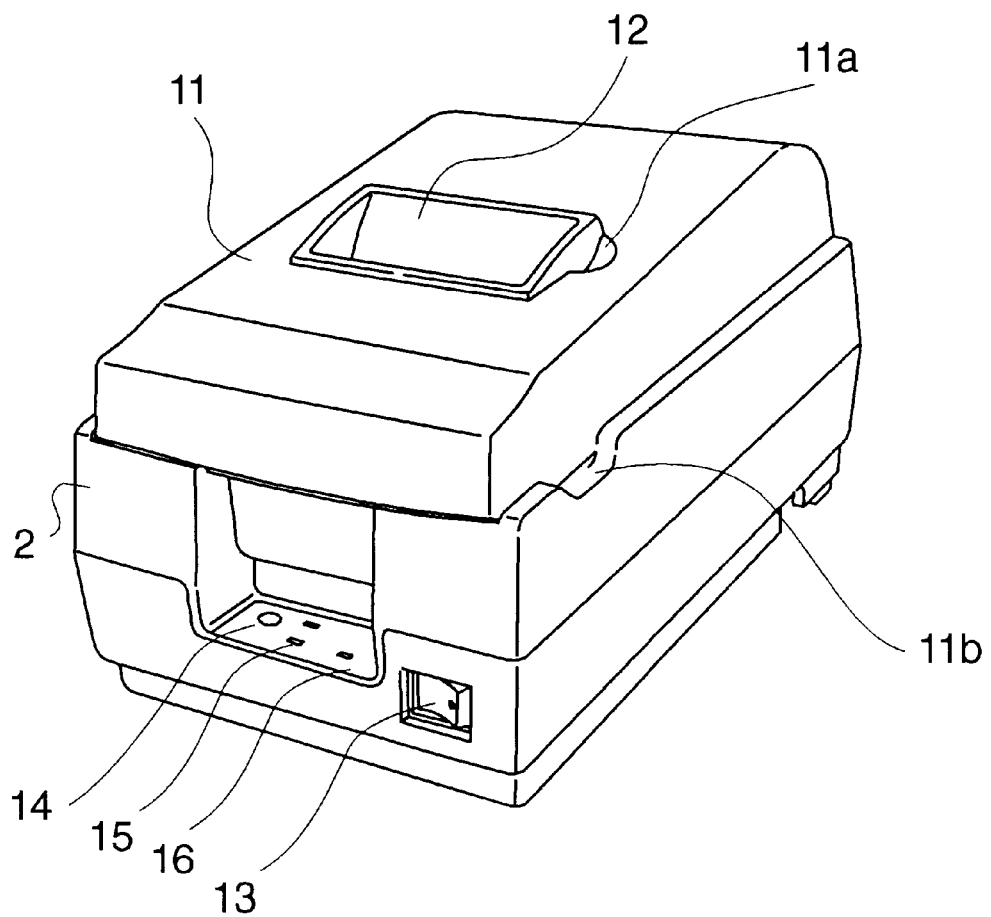
FIG. 1 is a perspective overview of a printer according to the preferred embodiment of the present invention.
Figure 2:
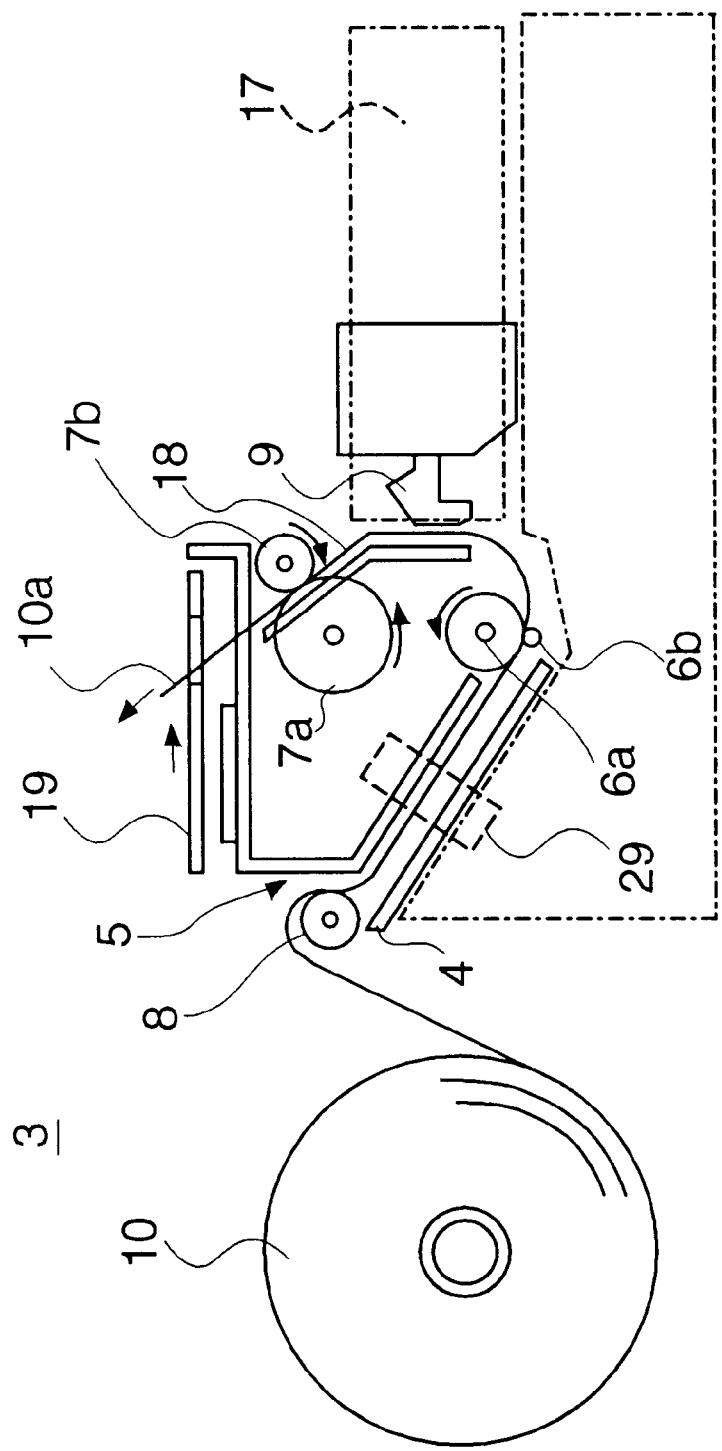
FIG. 2 is a cross sectional view of the printer mechanism used in the first embodiment of the present invention.

FIG. 1 is a perspective view of a printer 2 according to the present invention. Printer 2 comprises, as shown in FIG. 2, a paper transportation mechanism for transporting the roll paper by means of a stepping motor (not shown) and paper transport rollers 7a and 7b, a print assembly for printing to the roll paper 10 by means of ink ribbon 17 and print head 9, and a conventional paper-end sensor comprising for example a photo interrupter, lever switch, or other detection mechanism.

Referring back to FIG. 1, printer 2 further comprises a cover 11 to prevent the operator from accidentally touching the print assembly. Cover 11 can be opened by lifting up on the front edge near printer operating panel 16, thus rotating cover 11 up on a hinge (not shown) disposed at the opposite end and exposing the inside of the printer. An opening 12, through which the roll paper is ejected after printing, is disposed in the middle of the cover 11. When printer 2 is used for printing receipts, a cut receipt is ejected from opening 12.

Note that it is not essential for cover 11 to be connected to printer 2 by a hinge, and it is also possible to provide cover 11 in any manner allowing the cover 11 to be completely removed to open the printer 2. In this case it is further desirable to provide indents 11a in cover 11 on opposite sides of opening 12 and at approximately the center of gravity of cover 11 in the front-back direction. A recess 11b is also provided in the side of printer 2 to facilitate replacing the ink ribbon 17.

Printer operating panel 16 and power supply switch 13 are provided, for example, at the front of printer 2. Operating panel 16 is provided recessed from the front face of printer 2 to prevent accidental operation of the printer operating panel controls by the operator, and comprises a switch 14 that can be operated by the operator to advance the roll paper, and an indicator 15 used by the printer 2 to notify the operator of the current printer status. Note that while at least one light-emitting diode (LED) is used for indicator 15 in the present embodiment, the invention shall not be so limited and a liquid crystal display or other type of display may be alternatively used. A conductive rubber switch is also used as switch 14 in this embodiment, but the invention shall not be so limited as a variety of other push-button switches or momentary switches may be used. A power supply switch 13 is also provided recessed from the front face of printer 2 to prevent accidental operation by the operator.

FIG. 2 is a cross-sectional view of the roll paper printer used in the present embodiment. As shown therein roll paper 10 is already loaded into the print mechanism 3. Replenishing the roll paper is accomplished as follows.

The leading edge 10a of roll paper 10 is inserted to paper supply opening 5 and slid along paper guide 4. When leading edge 10a reaches the position of paper-end sensor 29, leading edge 10a of roll paper 10 is detected. If switch 14 is operated after leading edge 10a has been detected by paper-end sensor 29, paper transport rollers 6a, 6b and 7a, 7b rotate in the directions of the arrows. Paper transport rollers 6a, 6b thus grab leading edge 10a of roll paper 10, and the loading operation begins. When the paper has been advanced a predetermined distance, roll paper 10 passes between print head 9 and platen 18 and is set to the print position. The part of roll paper 10 advanced outside of print mechanism 3 is cut off by cutter 19 disposed above the print mechanism 3. Note that idling roller 8 is also disposed in front of paper supply opening 5 to reduce the paper transportation load originating in the inertial moment of roll paper 10.

Figure 3A:
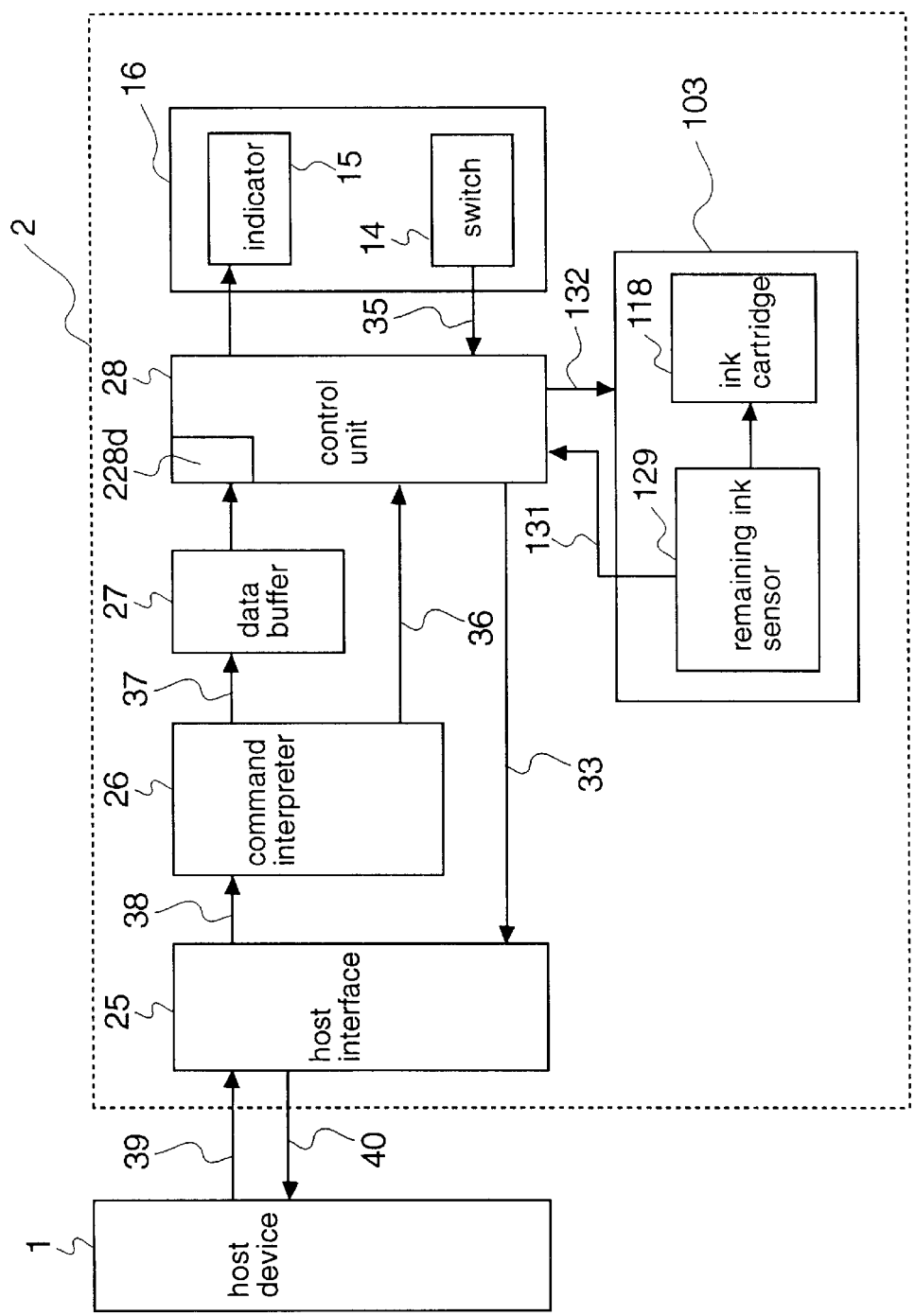
FIGS. 3A and 3B are a functional block diagrams of a printer according to the first, second and third embodiments respectively.
Figure 3B:
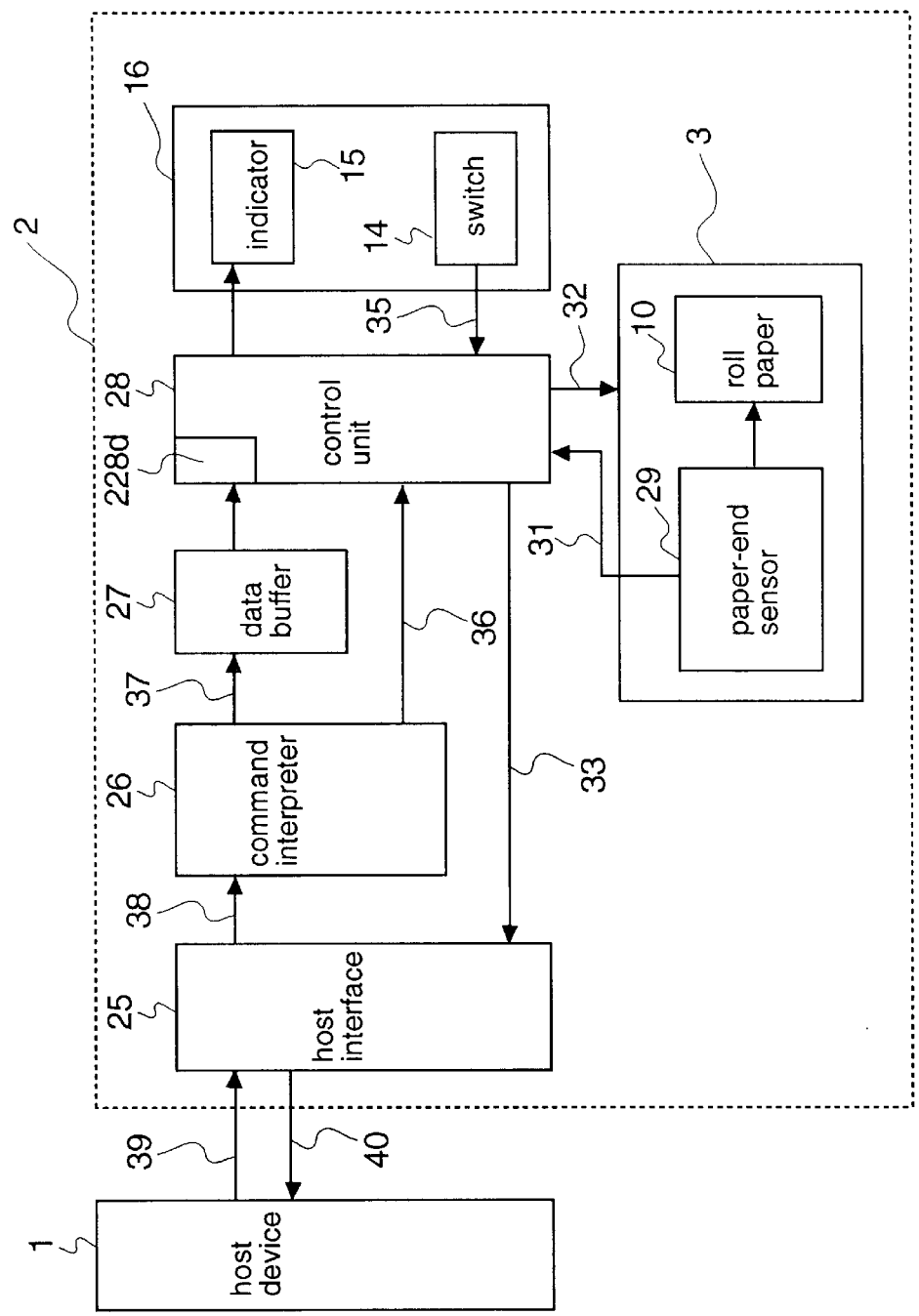

FIG. 3B is a block diagram describing in detail the functionality and operation of printer 2 of the present embodiment. The commands and print data 39 transmitted from host device 1 are received through a host interface 25 inside printer 2 of the present embodiment. The host interface 25 converts the received commands and print data 39 to the internal input data 38 format, and passes the internal input data 38 to command interpreter 26.

By interpreting internal input data 38, command interpreter 26 passes the real-time commands 36 to be executed immediately to control unit 28, and stores all other commands and the specific print data 37 to data buffer 27. Data buffer 27 is a first-in, first-out (FIFO) buffer from which the stored commands or print data 37 are output to and as requested by control unit 28 in the sequence in which they were received from command interpreter 26.

Real-time commands 36 received from command interpreter 26 are given priority execution by control unit 28, but other commands and print data 37 are sequentially read from data buffer 27 and executed. Control unit 28 also arbitrates signal sending and receiving between print mechanism 3 and the printer operating panel 16 as may be necessary for command execution, and passes internal output data 33 to host interface 25 as necessary. The host interface 25 then converts this internal output data 33 to printer status data 40, and forwards the printer status data 40 to host device 1.

Thus as described above, roll paper 10 is loaded to print mechanism 3, and the presence of roll paper 10 in print mechanism 3 is detected by paper-end sensor 29. The detection signal 31a output from paper-end sensor 29 is input to control unit 28, and a LOW detection signal 31a is used to indicate that no roll paper is loaded.

The control unit 28 also supplies a paper feed signal 32 to instruct print mechanism 3 to advance the roll paper. When paper feed signal 32 is HIGH, roll paper transportation begins and continues until the paper feed signal 32 is LOW again.

The switch signal 35 from switch 14 disposed in printer operating panel 16 is input to control unit 28, which selectively executes any of plural processes in accordance with the supplied switch signal 35.

More specifically, when the printer 2 is on-line, control unit 28 operates print mechanism 3 to print to the roll paper based on the supplied print data and commands. When operation of switch 14 is detected, the function assigned to switch 14 in that operating state is executed. When the end of roll paper 10 is detected by paper-end sensor 29, control unit 28 interrupts the printing process and therefore stops reading data from data buffer 27 to control unit 28. To prevent data loss resulting from the host device 1 continuing to supply command and print data exceeding the storage capacity of data buffer 27 at this time, the printer 2 goes off-line to disable data receiving. This off-line status is thus posted to the host device 1 using printer status data 40.

Note that when in the off-line state command and print data 39 actually continues to be received and interpreted. However, the normal commands and print data 37 converted from command and print data 39 cannot be stored when there is no remaining capacity in data buffer 27, and will therefore be lost. Therefore, when host device 1 is notified that printer 2 is off-line, host device 1 stops sending command and print data 39 immediately, except for real-time commands 36, and any data transmitted thereafter must be separately stored.

The process for replenishing the roll paper in printer 2 is described in detail below with reference to the flow chart in FIG. 4.

When it is first detected at step S61 from paper-out signal 31 that there is no more roll paper loaded, control unit 28 switches to the off-line state in step S62. Both the printing process and reading commands and data from data buffer 27 are interrupted in this off-line state. To therefore prevent an overflow of data buffer 27, control unit 28 informs host device 1 through host interface 25 that printer 2 is off-line, and host device 1 thus stops sending data. If paper-out signal 31 is not detected, the roll paper replenishing process is terminated immediately, and the normal process, i.e., printing, continues.

After an off-line state has been set in step S62, this off-line state is sustained until more roll paper 10 is loaded (step S63). When roll paper 10 is loaded and paper-out signal 31 determining that paper is present, the roll paper 10 loading process is executed in step S64. More specifically, control unit 28 sets paper feed signal 32 to the ACTIVE state, thus forcing print mechanism 3 to advance the paper a known distance. When this loading operation is finished, a timer t1 is set in step S65.

Note that this time t1 is the period for which the function of switch 14 is set to a paper feed function, thereby enabling the operator to transport the roll paper while the printer is off-line. When the roll paper leader is discolored or damaged, this function enables the operator to advance and remove the damaged leader after loading the roll paper.

It is then checked in step S66 whether switch 14 was operated. If it was operated, a paper feed signal is output to print mechanism 3 in step S67 to further feed the paper.

Because this paper feed operation requires a certain amount of time, the timer set to t1 may be reset after the paper is advanced. The control sequence shown as (1) in FIG. 4 is the sequence in which timer t1 is reset as above, i.e., is reset in step S68 to a new value t2 considering the time required for the paper feed operation. Control sequence (2) is the sequence whereby the timer is not reset, and sequence (3) is that in which the timer is reset to the same timer value t1.

If the period measured by the timer is completed by step S69, the function of switch 14 is changed in step S71 to an on-line selector enabling the operator to set the printer on-line again. The timer is then set to time t3 in step S72, and whether switch 14 was operated is checked in step S73. If switch 14 was pressed, control unit 28 determines that the printer 2 was reset to a printing-enabled state, restores the printer 2 on-line in step S77, and resumes data processing and the printing process if data is still stored in data buffer 27. Resumption of the on-line state is of course also reported to the host device 1. In addition, it is meaningless to sustain the on-line selector function of switch 14 once the printer is on-line again, and the function of switch 14 is therefore reset to the normal paper feed function in step S76.

It should be noted that if switch 14 must be pressed to restore the on-line state in the present embodiment, the printing process will not be resumed if the operator forgets to press the switch 14, and command and print data 39 are not sent from host device 1. This results in the entire data processing system containing host device 1 remaining off-line even though replenishing the consumable materials in printer 2 has been completed. The printer 2 is therefore also equipped with the functions described below.

The first additional printer function is a real-time command function commanding recovery of the on-line state. This real-time command is referenced as the "on-line recovery command" below. If the printer 2 determines that the received data is a real-time command as a result of data analysis by the command interpreter 26 (an interrupt process circuit), the real-time command is supplied immediately to the control unit 28 even if unprocessed data is still stored in data buffer 27. The control unit 28 thus executes this real-time command immediately. It should be noted that the command interpreter 26 shall not be limited to an interrupt process circuit, and can also be achieved by means of a regular polling process, a process for detecting a request when a particular process is completed, and other circuits or processes that execute relatively frequently.

This on-line recovery command process is described below with reference to the flow chart in FIG. 4. It should be noted that when the on-line recovery command is processed, a request flag for the on-line recovery process is set by control unit 28. The request flag is to be checked in step S75 of the control sequence show in FIG. 4

First, it is detected in step S69 whether it is time (i.e., the time timer t1 overflows, time Q below) to change the function of switch 14. It is assumed at time Q that the necessary loading and paper feed operations have been completed. If time Q has been reached, there is a high probability that replenishing roll paper 10 has been completed. Therefore, if the on-line recovery command input is detected by checking the request flag at or after time Q (step S75), printing is immediately enabled at step S77, and the on-line state is resumed. However, if the on-line recovery command is received before time Q, processing is paused until time Q (step S75), after which the same process is executed. It is therefore possible to reset the printer to an on-line state by means of a control command supplied from the host device 1 even if the operator forgets to press switch 14 after replenishing the paper.

The second additional printer function is a time-out function. More specifically, if in the flow chart in FIG. 4 switch 14 is not operated (step S73) by time t3 (step S74) after time Q at which the function of switch 14 should be changed and the on-line recovery command input has not been detected (step S75), a printing-process-enabled state is automatically restored by resetting the printer on-line in step S77. It will be obvious that the function of the paper feed switch changes to a normal paper feed function (step S76) at this time. Note that time t3 must be of a duration sufficient to complete the roll paper replenishing task. This makes it possible to restore the printing apparatus to an on-line state after the replenishing task is completed even if switch 14 is not operated.

It should be noted that the values for times t1, t2, and t3 may be set during the printer initialization process or by control commands from the host device 1. These times are measured using a timer integrated to the microprocessor in the present embodiment, and the respective processes are executed by issuing an event interrupt after a particular period of time. The invention shall not be so limited, however, and a time constant output from an integrator or differential circuit, or an NE 555 or other timer IC, may be alternatively used. The time can be set by setting a counter, by detecting the output of a D/A converter, or other known method.

Figure 5:
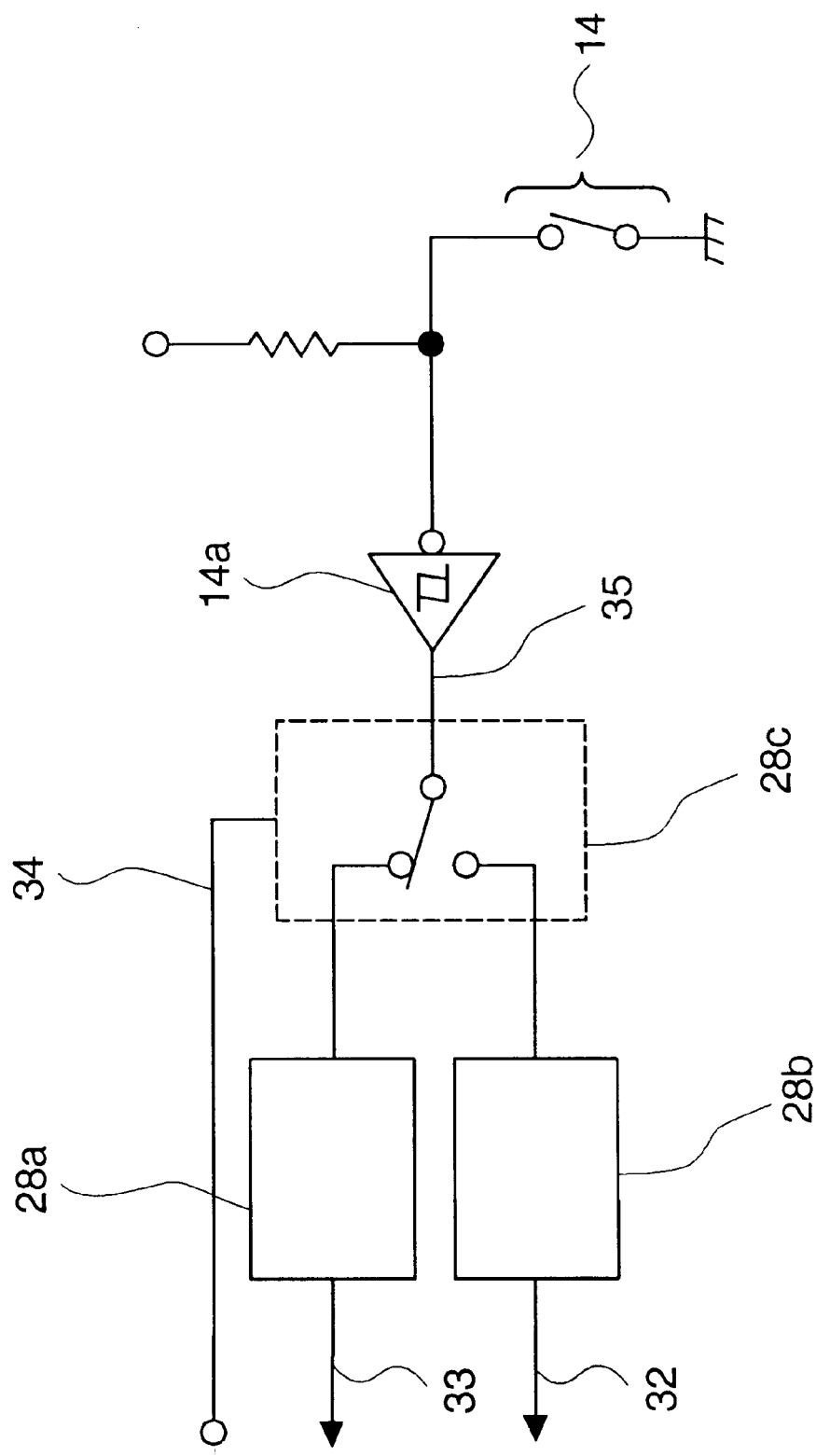
FIG. 5 is a block diagram of the switch function selector in a printer according to the preferred embodiment of the present invention.

FIG. 5 is a block diagram used to describe how the function of switch 14 is changed. Changing the function of switch 14 is accomplished by switching signal selector 28c to selectively connect switch signal 35 to on-line signal generator 28a or paper feed signal generator 28b, and by applying switched-function selector signal 34 controlling to which signal generator 28a or 28b the switch signal 35 should be connected. When switch 14 is pressed and a LOW level signal is input to the input buffer 14a, an inverted signal, i.e., a HIGH signal, is output from input buffer 14a as the switch signal 35. Switch signal 35 is then supplied by signal selector 28c to on-line signal generator 28a or paper feed signal generator 28b according to the switched-function selector signal 34.

More specifically, this is accomplished by changing the interpretation of the switch signal 35 in control unit 28. Control unit 28 is achieved with a microprocessor in the present embodiment, and changing the function of switch 14 is enabled by determining in the program processed by the microprocessor whether the state of the input port to which switch signal 35 applied specifies a paper feed operation or a shift to an on-line state. Alternatively signal selector 28c may be comprised of a data selector of common design to which the switched-function selector signal 34 from the microprocessor is supplied as the selector signal. In this case the data selector outputs are connected to corresponding microprocessor input terminals, and are used as signals requesting the specific functions.

Second Embodiment

While the first embodiment has been described using paper-end sensor 29 to detect the presence of a specific consumable material, i.e., roll paper 10, the present invention shall not be so limited. It is also possible to use a near-end sensor to detect a particular remaining amount of roll paper 10, a ribbon sensor to detect how much ink ribbon remains, or a remaining ink detector to detect how much ink remains in the ink cartridge of an ink jet printer.

Replacement of the ink cartridge is described next below by way of example as another consumable material. Note that further description of steps identical to those used in the roll paper replenishing process is omitted below.

The print mechanism of the present embodiment is designed to print to roll paper using an ink jet head disposed at the end of the ink cartridge. A remaining-ink sensor for detecting how much ink is left in the ink cartridge is disposed in proximity to the ink cartridge. Note that the remaining-ink sensor of the present embodiment uses a pair of electrodes disposed to the ink path inside the ink cartridge to detect the resistance between these electrodes. The invention shall not be limited to this sensor type, however, and other sensors may be used, including infrared sensors whereby an infrared beam is emitted to a reflector placed on the ink bag containing the ink and the reflectance is detected to determine how much ink is left through an amount of the deformation of the ink bag.

Figure 6:
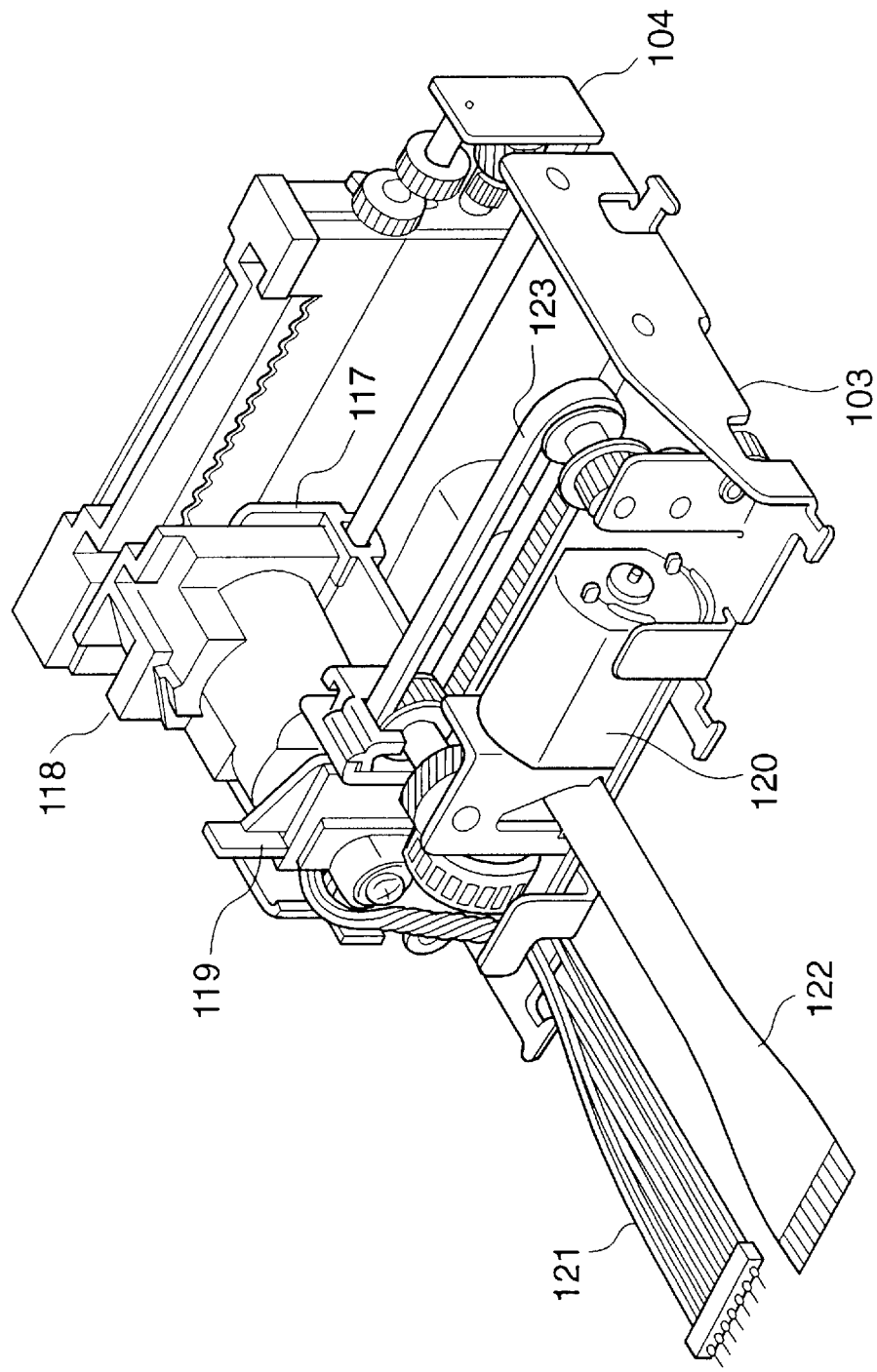
FIG. 6 is a perspective overview of the printer mechanism used in an alternative embodiment of the present invention.

FIG. 6 is an overview of the print mechanism 103 used in the printer 2 of the present embodiment. The roll paper or other recording medium is transported by paper feed unit 104 to the ink cartridge 118 and print head unit. The ink cartridge 118 is transported by carriage 117 and moves in the direction perpendicular to the direction of roll paper transport. It is therefore possible to print to the entire width of the recording paper. Note that this movement is accomplished by transferring the rotation of carriage motor 120 to carriage 117 via belt 123.

Ink cartridge 118 is replaced by operating replacement lever 119. More specifically, by moving replacement lever 119 toward the right side of the paper, carriage 117 and ink cartridge 118 are disengaged, and ink cartridge 118 can thus be easily removed by the operator. After then setting a new ink cartridge 118 to a particular location on carriage 117, the replacement lever 119 is returned to the original engagement position to re-engage ink cartridge 118 and carriage 117.

Plural electrical signals are supplied from the printer control circuit to print mechanism 103 via cables 121 and 122. Cable 121 includes wiring to fixed components of the print mechanism 103, including the carriage drive system location sensors (not shown in the figures) used to detect the print timing of the carriage motor 120, for example. Flexible cable 122 contains the wiring for the ink jet head (cartridge) 118 and remaining-ink sensor (not shown in the figure) mounted on the carriage. Note that wiring to the carriage must use a flexible cable 122 because the carriage travels perpendicularly to the direction of paper transport.

Figure 7:
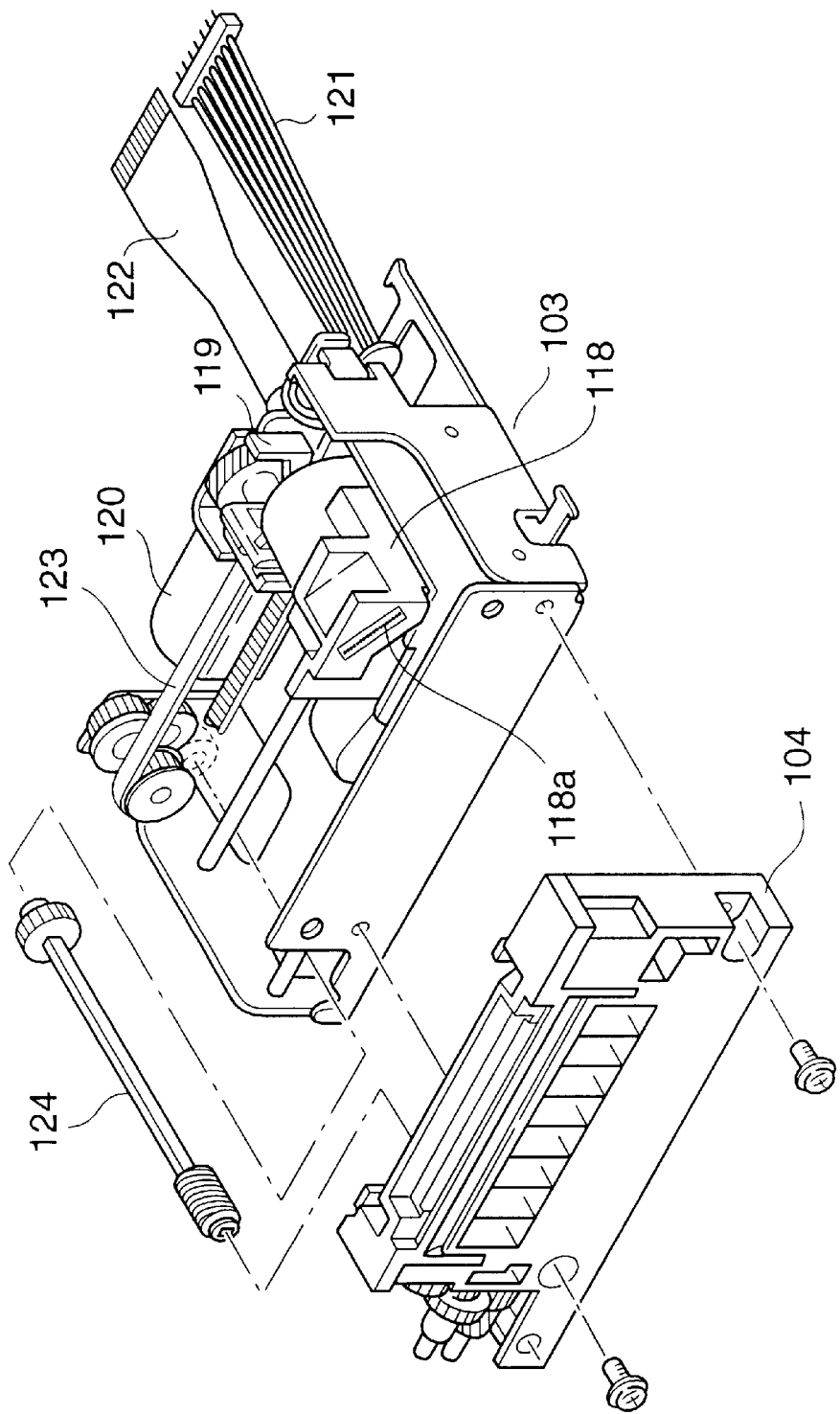
FIG. 7 is a partially exploded view of the printer mechanism used in an alternative embodiment of the present invention.

FIG. 7 is a partially exploded view of the print mechanism 103 and paper feed unit 104 of the present embodiment. As described above print mechanism 103 and paper feed unit 104 are connected via a drive shaft 124 whereby the drive force for the paper feed unit 104 is transferred from the carriage motor 120. However, a gear set used for intermittent paper feeding is provided on the paper feed unit side to advance the paper in line increments. More specifically, the paper is not advanced until the carriage has traveled a one-line equivalent, after which the paper is advanced one line between the completion of one line and the beginning of the next line.

The ink jet head is provided at the one end of the ink cartridge 118 with plural ink nozzles 118a exposed. To adjust the relationship between the nozzle pitch (the distance between ink nozzles) and the dot pitch (the distance between the ink dots in the direction of paper travel), the ink jet head is not arrayed parallel to the direction of paper travel but at a specific angle thereto.

FIG. 3A is a block diagram used to describe the functions of this printer 2 and is the same as the block diagram (FIG. 3B) referenced above, and further description of the common elements thereof is omitted below.

As described above, print mechanism 103 comprises an ink cartridge 118 and remaining-ink sensor 129. The amount of remaining ink is detected in this embodiment by measuring the resistance between two electrodes disposed in the ink path inside ink cartridge 118, and the remaining-ink sensor 129 therefore corresponds to these electrodes. Note that the circuit for detecting the remaining ink level based on the resistance between these electrodes can be achieved using various known methods, including a constant current circuit converting this resistance to a voltage and a comparator for comparing the converted voltage with a known voltage value. Remaining ink detection signal 131 from the remaining-ink sensor 129 is input to control unit 28. Though the ink detection signal 131 is then digitized by the circuitry described above in the present embodiment, it should be noted that the ink detection signal 131 may be generated as a digital signal by the remaining-ink sensor 129.

The print mechanism 103 also flushes ink nozzles 118*a* according to a refresh signal 132 from control unit 28. More specifically, when refresh signal 132 is HIGH, the carriage is moved to a position suitable for refreshing the nozzles, and the nozzles are flushed until refresh signal 132 becomes LOW again.

Figure 8:
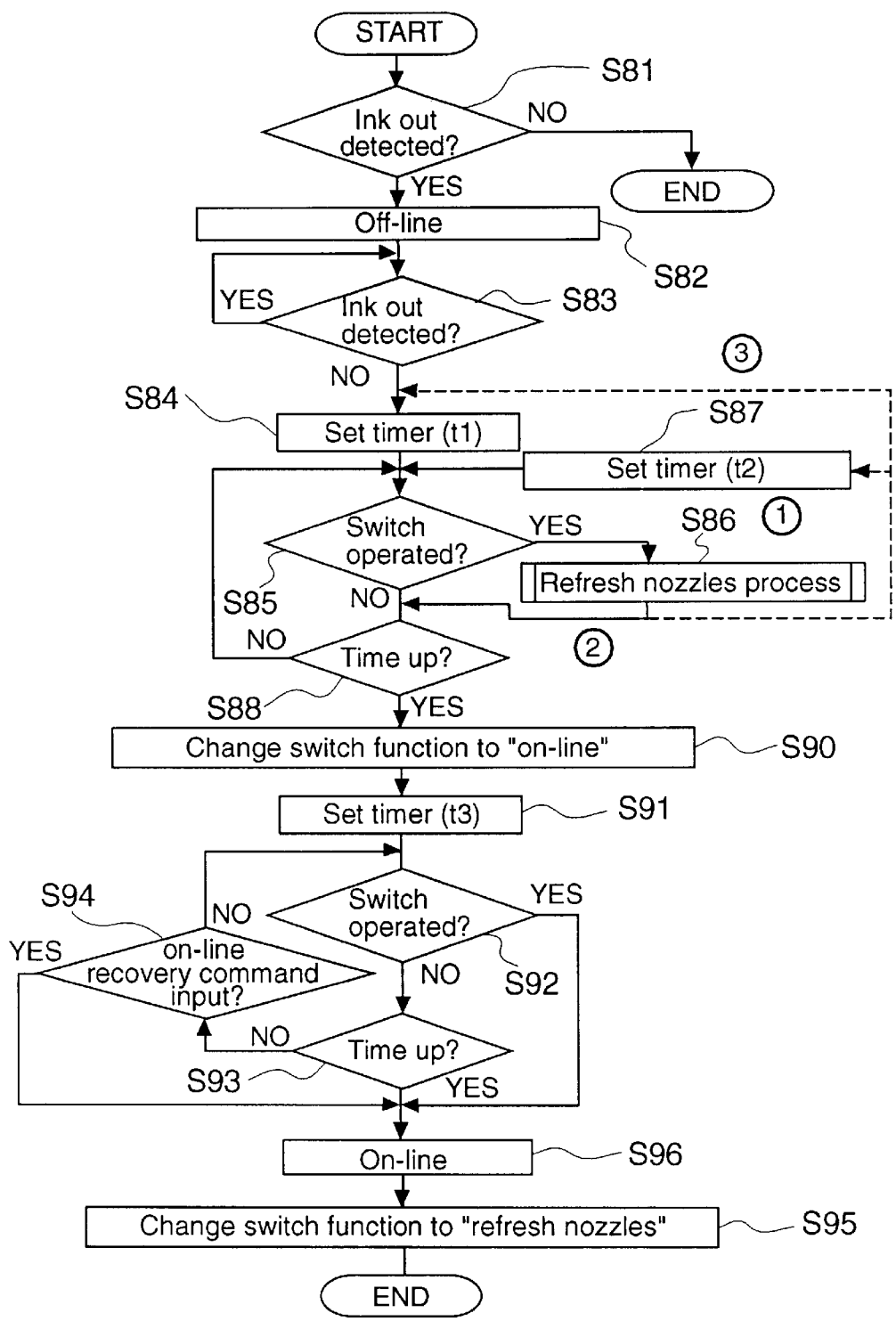
FIG. 8 is a flow chart used to describe the operation of a printer according to the alternative embodiment of the present invention.

The ink cartridge replacement operation of printer 2 according to the present embodiment is described next with reference to FIG. 8. This operation is substantially identical to the roll paper rep operation described above, and only the differences are therefore described below.

Because ink cartridge 118 is carried on carriage 117 in the present embodiment, it could be dangerous to commence the refresh operation immediately after (step S83) ink cartridge replacement is detected. This is because it is not possible to detect whether the operator has removed his hand from ink cartridge 118. Unlike the replenishing operation described above, printer 2 therefore does not begin the refresh operation at this time.

The number of times the nozzles are flushed in the first refreshing operation after the ink cartridge is replaced is preferably greater than the number of times the nozzles are flushed in response to refresh operations initiated by operating a switch. Even with new ink cartridges the ink in the nozzles is often highly viscous, and more flushing operations are therefore required to adequately refresh the nozzles. This also helps prevent increasing the ink volume that must be ejected from the nozzles for normal refresh operations initiated by operating a switch. It is also possible to continue flushing the nozzles for as long as the switch is depressed, thereby enabling the operator to control how much ink is ejected from the nozzles during each refresh operation.

Once the operator presses switch 14 after replacement of ink cartridge 118 has been detected in this embodiment, it is determined that the operator is also ready and the first refresh operation is started. Flushing is also repeated in response to operation of switch 14 until timer t1 overflows.

Third Embodiment

As described above, the present invention provides for a printer that goes off-line when the remaining amount of selected consumable materials is detected by means of sensors to have dropped below certain levels an effective method and apparatus for informing the printer without using dedicated switches that the depleted consumable materials have been replenished. It will also be obvious that those skilled in the related art can by making the necessary adaptations to the first and second embodiments described above apply the present invention to all consumable materials used by such a printer.

The processes executed when it is detected that consumable printer parts or supplies are depleted or nearly depleted have been described above, but it should be noted that the following problems may occur depending upon the operating environment and field of application when a dedicated cover opening sensor and switch for selecting the on-line or off-line state are eliminated. More specifically, when a problem that cannot be evaluated by the printer occurs or the wrong print data is sent to a printer from which such dedicated controls are eliminated, cutting off the power supply to the printer is the only way to stop the printing operation of the printer. When the power is thus turned off, however, all commands and print data already sent to and stored in the printer will be lost. The embodiment of the invention described below therefore relates to an effective apparatus and method whereby the printing process can be interrupted without turning the printer power off.

This problem is resolved in the third embodiment by selectively changing, according to the status of the printing apparatus, the function of the paper feed switch, which is normally used to force the printing apparatus to advance the recording paper. More specifically, once the printer starts a printing process the paper feed switch, refresh switch, and other operator switches are not used until the printing process is completed. It is therefore possible during this time to change the function of these switches to on-line/off-line selector switches. When one of these switches is operated after the printing process starts in the present embodiment, the control unit that controls the printing process changes the printer status from on-line to off-line, interrupting the printing process and resulting in a state in which storing the received data is not assured.

The construction of printer 2 of this embodiment is substantially identical to that of the first embodiment. Only the differences between the first and present embodiments are described below.

First, plural LEDs 15 constituting an LED group are provided to display the plural operating states of the printer as described below. The on/off state of these LEDs 15 is controlled by control unit 28, which also controls the printing process.

A print buffer 228*d* for storing one line of bit-mapped data converted for printing from the print data read from data buffer 27 is also provided in control unit 28. The bit-mapped data stored in print buffer 228*d* is read in the array sequence of the printer elements of print head 9, and is deleted after being read. Storing data to print buffer 228*d* is accomplished parallel to the paper feed, carriage return, or similar operation executed after printing one line is completed. This means that the printing apparatus is either in the process of printing one line or is prepared and standing by to print one line if data is stored in print buffer 228*d*.

The control method of the printing apparatus according to the present embodiment is described next with reference to the flow chart in FIG. 9.

At step S210 printer 2 performs the standard printing process initialization procedure and any other process normally executed thereafter. At step S211 the printing apparatus goes on-line and stands by to receive data. When no data has been received and is stored (step S212) and when switch 14 is operated at this time (step S223), the recording paper is advanced a particular distance or time corresponding to the period or number of times the switch is pressed (step S224).

When the printing apparatus begins receiving data, (step S212) the data in the receive buffer is converted to bit-mapped data and stored to print buffer 228*d*. When all of the data needed to print one line has been buffered, the printing process starts at step S213. It should be noted that a memory area with capacity to store one line of bit-mapped data is used for print buffer 228d in the third embodiment because the printer of this embodiment is assumed to be a so-called serial printer. The invention is also applicable to page printers, however, in which case the capacity of print buffer 228d is simply increased to store the bit-mapped data for one page.

If switch 14 is not operated at step S214, it is determined in step S215 whether the next line of print data is stored to print buffer 228d. If there is no data in print buffer 228d, it is determined whether any unprocessed print data remains in the receive data buffer 27 at step S216. If unprocessed print data is in the receive data buffer 27, the printing process is continued (step S213). If there is no unprocessed print data, the printing process stops at step S217. The procedure then loops back to step S212 and the printing apparatus again awaits data from the host device.

If switch 14 is operated during the printing process (step S214), printer 2 processes the switch signal as an emergency stop command and goes off-line at step S220 to block receiving print data. The printing process is also interrupted at step S221, the data already stored in print buffer 228d and receive data buffer 27 is protected (step S222), and printer 2 then waits for cancellation of the printing process interrupt from step S225.

Whether switch 14 operates as a paper feed switch or an on-line/off-line selector switch is determined in the present embodiment by whether any data is stored in receive data buffer 27. More specifically, the function of switch 14 is changed simultaneously to the start of data receiving from the host device 1 at step S212.

If printer 2 has been stopped by the operator in the middle of a printing process, it is possible in the present embodiment to resume the interrupted printing process using switch 14. After waiting a particular standby period in step S225, printer 2 checks operation of switch 14 again in step S226. If switch 14 is operated, printer 2 determines that the problem has been corrected and resumes printing with entering the on-line state at step S237.

Note that a printing process in progress can be canceled by host device 1 issuing a real-time command to clear print buffer 228d and receive data buffer 27. To enable this, printer 2 checks in step S227 for operation of switch 14 while simultaneously checking for input of a real-time command commanding cancellation of the printing process. If this real-time command is input, a process for clearing the designated buffers is executed at step S218, and the on-line status is entered at step S219. While printer 2 waits for a printing process cancellation command it also monitors the passage of the particular standby period set in step S225 (step S228). If this standby period elapses, an error is announced by, for example, sounding a buzzer or lighting one of the LEDs included in an indicator 15 or other display means in step S229.

In the third embodiment operation of switch 14 during the printing process is monitored in step S214 following the one-line printing process in step S213. The present invention shall not be so limited, however, and an interrupt process or other known means can also be used to monitor switch operation within and parallel to the printing process.

The operator performing the particular operations of the third embodiment should be aware of the current printer status, but other operators may not be similarly aware of the current printer status. More specifically, it is difficult to know whether the printing apparatus is stopped because of an interrupted printing process or because the printing apparatus is waiting for data. This problem can be resolved by adding the control apparatus and method described below.

Figure 9:
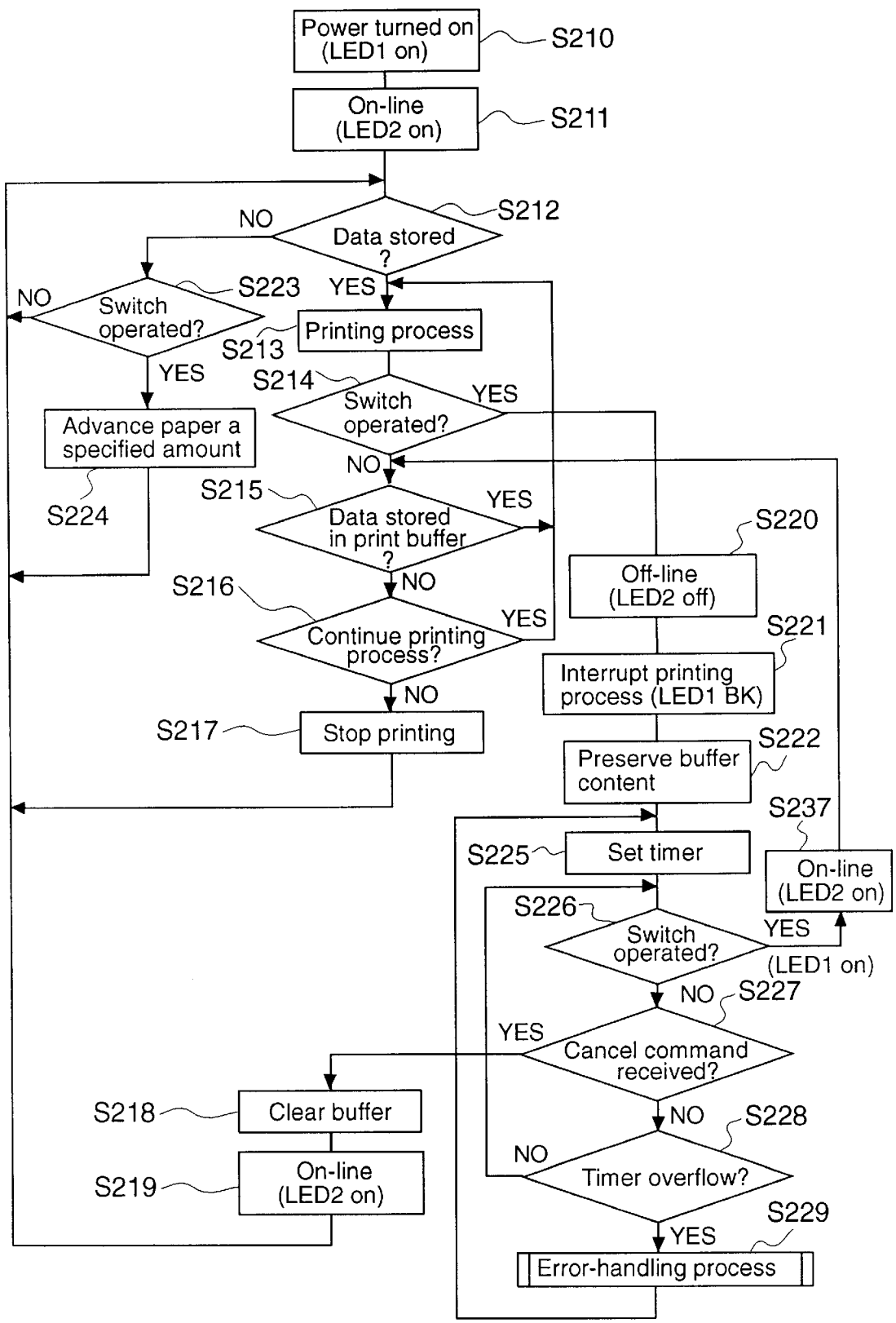
FIG. 9 is a flow chart of the control method of a further alternative embodiment of the present invention.
Figure 10:
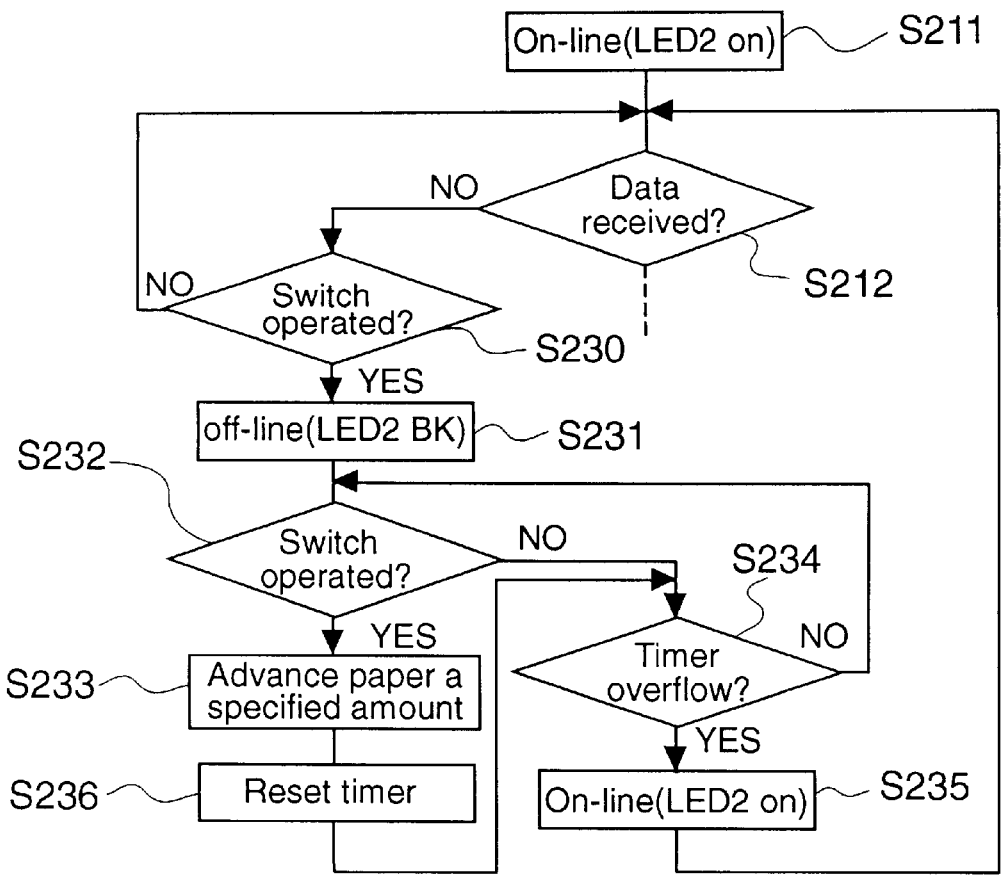
FIG. 10 is a flow chart of the control method of the further alternative embodiment of the present invention.

FIG. 10 is a flow chart of the control method implemented in the control unit 28 of printer 2 according to the present invention. Like process steps are identified by like step numbers in FIGS. 9 and 10, and further description thereof is thus omitted below.

If switch 14 is operated at step S230 while waiting for data in step S212, the printer 2 goes off-line in step S231, a timer is set to measure a known period, and the next switch operation is awaited. If switch 14 is operated in step S232, the paper is advanced a particular distance according to the switch operation (step S233), and the timer is reset (step S236). This keeps the printer off-line for as long as the paper feed operation is continued. However, if there is no switch operation after waiting a particular period (step S234), the on-line status is automatically restored in step S235. The present embodiment thus differs from the above embodiment in that the printer waits for a paper feed command after going off-line from an on-line state.

To distinguish between an emergency stop and a paper feed wait state, indicator 15 on the operating panel may contain a plurality of LEDs. These LEDs are controlled to indicate the appropriate printer status. To accomplish this, the LED states may be defined as follows by way of example only.

```
LED1, on    power switch ON
    blinking    emergency stop state
LED2, on    on-line state
    blinking    off-line, waiting for paper feed
LED3, on    consumable materials depleted
    blinking    waiting for on-line state after replenishing consumable
materials
```

Operation of indicator 15 is controlled by control unit 28. It should be noted that LED blinking can be achieved by means of various known methods, including using a timer interrupt function, for example, built in to the microprocessor constituting control unit 28, and specific description thereof is therefore omitted. The LED controls states accomplished by control unit 28 in the flow charts in FIG. 4, FIG. 9, and FIG. 10 are therefore as described below in the present embodiments.

Figure 4:
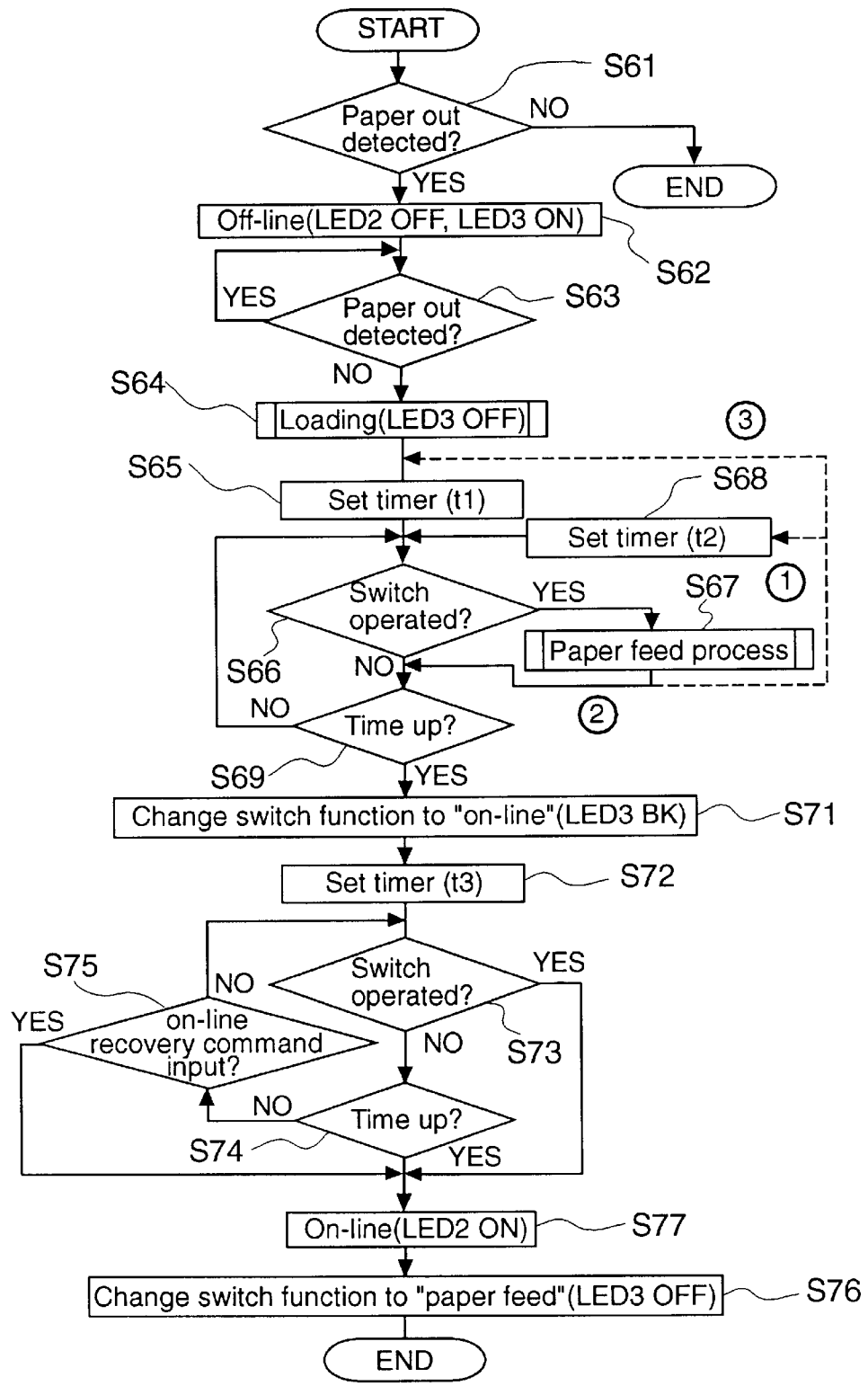
FIG. 4 is a flow chart used to describe the operation of a printer according to the first embodiment of the present invention.

In FIG. 4, step S62, LED2 is off and LED3 is on; LED3 is then off in step S64, blinking in step S71, and off in step S76; and LED2 is on in step S77.

In FIG. 9, LED1 is on in step S210; LED2 is on in step S211, on in step S219 and S237, and off in step S220; LED1 is blinking in step S221, and if it is detected in step S226 that switch 14 was operated, LED1 is on in step S226.

In FIG. 10 LED2 is blinking in step S231, and is on in step S235.

By thus differentiating the LED display states, the operator can quickly determine the operating status of printer 202 at a glance.

It is therefore possible by means of the control apparatus and method described above for a single switch to be selectively used for two functions, e.g., to be used as a paper feed switch and as an on-line/off-line selector switch, and operating errors can be prevented.

It will be obvious that the printer according to the present invention shall not be limited to a serial printer 2 as described above, and the invention can also be applied to parallel printers. The control method of the invention shall also not be limited to consumption of roll paper as described above, and can be adapted to detect consumption of all types of consumable materials, including detecting the service life of ink ribbons used in dot impact printers and thermal transfer printers, and detecting ink consumption in ink jet printers.

By eliminating the need for dedicated on-line switches and cover sensors to restore the printer to an on-line state as described above, the present invention is able to reduce printer size, lower printer cost, and improve printer reliability. It is also possible by means of the invention to appropriately reset the printer to an on-line state even if an on-line selector switch is not operated once a sufficient period has passed since the consumable materials were replenished.

It is also possible to prevent operating errors and achieve reliable operation by means of a display for appropriately displaying the printer status associated with a switch operation.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printing apparatus consuming at least one consumable material, wherein the consumable material comprises at least one of a marking medium and print medium, said printing apparatus comprising:
   a transport mechanism which transports the print medium;
   a print section which prints with the marking medium to the print medium transported by said transport mechanism in accordance with data received from a host device, and selectively switches between an on-line state in which processing of the host data is assured and an off-line state in which processing of the host data is not assured, and wherein said print section notifies the host device of the currently selected state;
   consumable material detector for detecting one of a consumption and an absence and one of a replenishment and a presence of the consumable material consumed by said printing apparatus;
   an operating member manually operated and selectively comprising
   (1) a first function for causing, in accordance with an operation of said operating member, a transition of said print section from the off-line state to the on-line state, and
   (2) a second function for causing, in accordance with the operation of said operating member, said print section to execute another process in relation to the consumable material;
   a first state switcher which causes the state transition of said print section to the off-line state upon detection of one of consumption and absence of the consumable material by said consumable material detector; and
   a first function selector which selects the first function of said operating member upon detection of one of replenishment and presence of the consumable material by said consumable material detector after said first state switcher causes the state transition of said print section to the off-line state.

2. A printing apparatus according to claim 1,
   wherein the consumable material detector comprises a print medium end sensor for roll print medium; and
   wherein the second function of said operating member comprises a function for commanding transportation of the roll print medium by said transport mechanism.

3. A printing apparatus according to claim 1,
   wherein said printing section comprises an ink jet head,
   wherein said ink jet head comprises an ink cartridge containing ink,
   wherein said consumable material detector comprises a remaining-ink sensor for detecting ink in said ink cartridge, and
   the second function of said operating member comprises a function for commanding an ink head refresh operation of said ink jet head.

4. A printing apparatus according to claim 1,
   further comprising a first timer for measuring a first predetermined period based on one of the replenishment and presence detected by said consumable material detector, and
   wherein said first function selector selects said first function of said operating member in accordance with said first timer.

5. A printing apparatus according to claim 4, wherein said first timer increases the first predetermined period when said operating member is operated before measuring the first predetermined period is completed.

6. A printing apparatus according to claim 4 further comprising a third state switcher for setting said printing section in the on-line state from the off-line state after said first timer has measured the first predetermined period based on specific data received from the host device.

7. A printing apparatus according to claim 1,
   wherein said operating member further comprises a third function for commanding a state change in said printing section from the on-line state to the off-line state, and
   wherein said printing apparatus further comprises a third function selector for selecting the third function of said operating member during execution of the printing process.

8. A printing apparatus according to claim 7, further comprising printing process controller which stops the printing process in accordance with operation of said operating member.

9. A printing apparatus according to claim 8,
   wherein said operating member further comprises a fourth function for commanding said printing section to resume the printing process stopped by said printing process controller, and
   wherein said printing apparatus further comprises a fourth function selector for selecting the fourth function of said operating member after the printing process controller has stopped the printing process.

10. A printing apparatus according to claim 1,
    further comprising a display for displaying at least one of the selected one of the on-line and off-line states of said printing section and
    the selected one of the first and second functions of said operating member.

11. A printing apparatus according to claim 9 further comprising:
    a fourth timer for counting a fourth predetermined period in accordance with said fourth function selector, and
    an error indicator for generating an indication in accordance with said fourth timer when said operating member has not been operated.

12. A printing apparatus according to claim 4,
    wherein said first function selector selects said first function of the operating member after said first timer measures the first predetermined period.

13. A printing apparatus consuming at least one consumable material, wherein the consumable material comprises at least one of a marking medium and print medium, said printing apparatus comprising:

a transport mechanism which transports the print medium;

a print section which prints with the marking medium to the print medium transported by said transport mechanism in accordance with data received from a host device, and selectively switches between an on-line state in which processing of the host data is assured and an off-line state in which processing of the host data is not assured, and wherein said print section notifies the host device of the currently selected state;

consumable material detector for detecting one of a consumption and an absence and one of a replenishment and a presence of the consumable material consumed by said printing apparatus;

an operating member manually operated and selectively comprising (1) a first function for causing, in accordance with an operation of said operating member, a transition of said print section from the off-line state to the on-line state, and (2) a second function for causing, in accordance with the operation of said operating member, said print section to execute another process in relation to the consumable material;

a first state switcher which causes the state transition of said print section to the off-line state upon detection of one of consumption and absence of the consumable material by said consumable material detector;

a first function selector which selects the first function of said operating member upon detection of one of replenishment and presence of the consumable material by said consumable material detector after said first state switcher causes the state transition of said print section to the off-line state;

a first timer for measuring a second predetermined period in accordance with selection by said first function selector of the first function of said operating member; and a second state switcher for switching said printing section to the on-line state in accordance with an output from said second timer.

14. A printing apparatus consuming at least one consumable material, wherein the consumable material comprises at least one of a marking medium and print medium, said printing apparatus comprising:

a transport mechanism which transports the print medium;

a print section which prints with the marking medium to the print medium transported by said transport mechanism in accordance with data received from a host device, and selectively switches between an on-line state in which processing of the host data is assured and an off-line state in which processing of the host data is not assured, and wherein said print section notifies the host device of the currently selected state;

consumable material detector for detecting one of a consumption and an absence and one of a replenishment and a presence of the consumable material consumed by said printing apparatus;

an operating member manually operated and selectively comprising (1) a first function for causing, in accordance with an operation of said operating member, a transition of said print section from the off-line state to the on-line state, and (2) a second function for causing, in accordance with the operation of said operating member, said print section to execute another process in relation to the consumable material;

a first state switcher which causes the state transition of said print section to the off-line state upon detection of one of consumption and absence of the consumable material by said consumable material detector; and a first function selector which selects the first function of said operating member upon detection of one of replenishment and presence of the consumable material by said consumable material detector after said first state switcher causes the state transition of said print section to the off-line state;

wherein said operating member further comprises a third function for commanding a state transition in said printing section from the on-line state to the off-line state, and wherein said printing apparatus further comprises a third function selector for selecting the third function of said operating member when data received from the host device does not remain unprocessed in said printing section.

15. A printing apparatus according to claim 14, further comprising:

a first timer for counting a first timing period in accordance with said third function selector, and a second state switcher for changing the state of said printing apparatus from the off-line state to the on-line state in accordance with said third timer.

16. A control method for controlling a printing apparatus that comprises a manually operable operating member having a plurality of functions and a printing section which prints to a print medium by executing a printing process in accordance with data received from a host device, comprising the steps of:

(a) detecting one of a consumption and an absence and one of replenishment and presence of a consumable material consumed in the printing process;

(b) causing the printing apparatus to enter an off-line state in which processing of the data received from the host device is not assured in accordance with the detection of one of the consumption and absence of the consumable material in step (a);

(c) detecting one of replenishment and presence of the consumable material in step (a) after the printing apparatus has entered the off-line state in step (b); and (d) setting a function of the operating member to cause in accordance with operation of the operating member the printing apparatus to switch from the off-line state to an on-line state in which processing of the data received from the host device is assured when detecting one of replenishment and presence of the consumable material in step (c).

17. A control method according to claim 16, further comprising the steps of:

(e) measuring a first predetermined period in accordance with detection of one of replenishment and presence of the consumable material in step (c); and (f) setting the function of the operating member to cause the printing apparatus to execute another process in relation to the consumable material in accordance with operation of the operating member before step (e) is completed;

wherein step (d) is accomplished after the first predetermined period of time has measured in step (e).

18. A control method according to claim 16, wherein first predetermined period of step (e) is extended when the operating member is operated before measurement of the first predetermined period is completed in step (e).

19. A control method according to claim 17 further comprising the step of:
(i) changing the printing apparatus to the on-line state in accordance with specified data received from the host device after measuring the first predetermined period in step (e).

20. A control method according to claim 16, further comprising the steps of:
(j) changing the function of the operating member to causing, in accordance with operation of the operating member during the printing process, the printing apparatus to switch from the on-line state to the off-line state;
(k) stopping the printing process in accordance with the change in the printing apparatus state caused in accordance with operation of the operating member; and
(l) changing the function of the operating member to causing, in accordance with operation of the operating member, the printing apparatus to switch from the off-line state to the on-line state and to resume the printing process stopped in step (k) after the change in the printing apparatus state has been caused in accordance with operation of the operating member during the printing process.

21. A control method according to claim 16, wherein after a predetermined time after the detection in step (c) when manually operating the operating member the printing apparatus is caused to change from the on-line state to the off-line state.

22. A control method for controlling a printing apparatus that comprises a manually operable operating member having a plurality of functions and a printing section which prints to a print medium by executing a printing process in accordance with data received from a host device, comprising the steps of:
(a) detecting one of a consumption and an absence and one of replenishment and presence of a consumable material consumed in the printing process;
(b) causing the printing apparatus to enter an off-line state in which processing of the data received from the host device is not assured in accordance with the detection of one of the consumption and absence of the consumable material in step (a);
(c) detecting one of replenishment and presence of the consumable material in step (a) after the printing apparatus has entered the off-line state in step (b);
(d) setting a function of the operating member to cause in accordance with operation of the operating member the printing apparatus to switch from the off-line state to an on-line state in which processing of the data received from the host device is assured when detecting one of replenishment and presence of the consumable material in step (c);
(e) measuring a first predetermined period in accordance with the detection of one of replenishment and presence of the consumable material in step (c); and
(f) changing the printing apparatus to the on-line state after measuring the first predetermined period in step (f).

23. A printing apparatus consuming at least one consumable material, wherein the consumable material comprises at least one of a marking medium and print medium, said printing apparatus comprising:
a transport mechanism for transporting the print medium;
a printer to print on the print medium with the marking medium in accordance with data received from a host device, and said printer selectively switches between a first state assuring processing of the host data and a second state in which processing the host data is not assured, and wherein said printer notifies the host device of the currently selected state;
a consumable material detector that detects one of a consumption and an absence and one of a replenishment and a presence of the consumable material consumed by said printing apparatus;
a manual input device coupled to said printer, said manual input device selectively comprising
(1) a first function for commanding said printer to transition from the second state to the first state and
(2) a second function for specifying another process to be executed by said printing apparatus;
a first state controller to set said printer to the second state upon detection of one of consumption and absence of the consumable material by said consumable material detector; and
a function selector for selecting the second function of said manual input device upon detection of one of replenishment and presence of the consumable material by said consumable material detector after said first state controller causes said printing apparatus to enter the second state.

24. A printing apparatus according to claim 23,
further comprising a first timer to measure a first predetermined period based on one of the replenishment and presence detected by said consumable material detector, and
wherein said function selector selects said first function of said manual input device after said first timer measures the first predetermined period.

25. A printing apparatus consuming at least one consumable material, wherein the consumable material comprises a marking medium and print medium, said printing apparatus comprising:
a transport mechanism for transporting the print medium,
a printer to print on the print medium with the marking medium in accordance with data received from a host device, and the printer selectively switches between a first state assuring processing of the host data and a second state in which processing of the host data is not assured, and wherein said printer notifies the host device of the currently selected state:
a consumable material detector that detects one of a consumption and an absence and one of a replenishment and a presence of the consumable material consumed by said printing apparatus;
a manual input device coupled to said printer, said manual input device selectively comprising
(1) a first function for commanding said printer to transition from the second state to the first state and
(2) a second function for specifying a process to be executed by said printing apparatus;
a first state controller to set said printer to the second state upon detection of one of consumption and absence of the consumable material by said consumable material detector; and
a function selector for selecting one of
(1) the first function of said manual input device after detection of one of replenishment and presence of the consumable material by said consumable material detector, and
(2) the second function of said manual input device after said manual input device is operated during the first function of said manual input device is selected.

* * * * *

UNITED STATES PATENT AND TRADEMARK OFFICE
CERTIFICATE OF CORRECTION

PATENT NO. : 5,987,224
DATED : November 16, 1999
INVENTOR(S) : Naohiko Koakutsu, et al.

It is certified that error appears in the above-identified patent and that said Letters Patent is hereby corrected as shown below:

Column 15, line 27, change "marking medium and" to --print medium and a marking medium used to print on the--.

Column 15, line 30, delete "with the marking medium".

Column 17, line 3, change "marking medium and" to --print medium and a marking medium used to print on the--.

Column 17, line 6, delete "with the marking medium".

Column 17, line 47, change "marking medium and" to --print medium and a marking medium used to print on the--.

Column 17, line 50, delete "with the marking medium".

Column 18, line 65, change "claim 16" to --claim 17--.

Column 19, line 62, change "marking medium and" to --print medium and a marking medium used to print on the--.

Column 19, line 65 – 66, delete "with the marking medium".

Column 20, line 33, insert --at least one of-- after "comprises".

UNITED STATES PATENT AND TRADEMARK OFFICE
CERTIFICATE OF CORRECTION

PATENT NO. : 5,987,224  
DATED : November 16, 1999  
INVENTOR(S) : Naohiko Koakutsu, et al Page 2 of 2

It is certified that error appears in the above-identified patent and that said Letters Patent is hereby corrected as shown below:

Column 20, line 34, change "marking medium and" to --print medium and a marking medium used to print on the--.

Column 20, line 37 – 38 delete "with the marking medium".

Signed and Sealed this

Twenty-eighth Day of November, 2000

Attest:

Q. TODD DICKINSON

*Attesting Officer*    *Director of Patents and Trademarks*